Figure 2E:
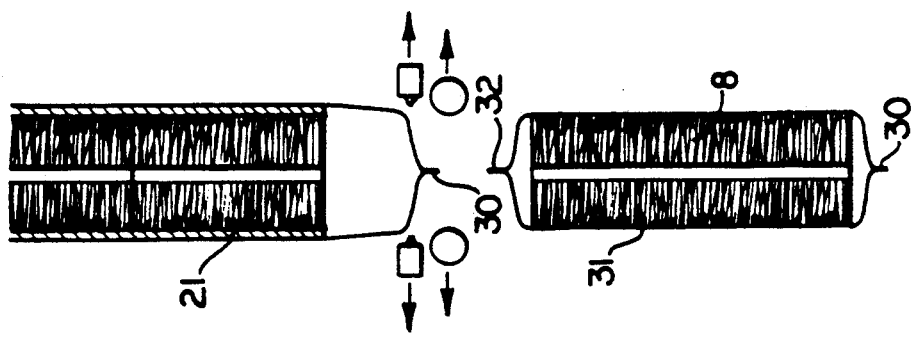
Figure 2D:
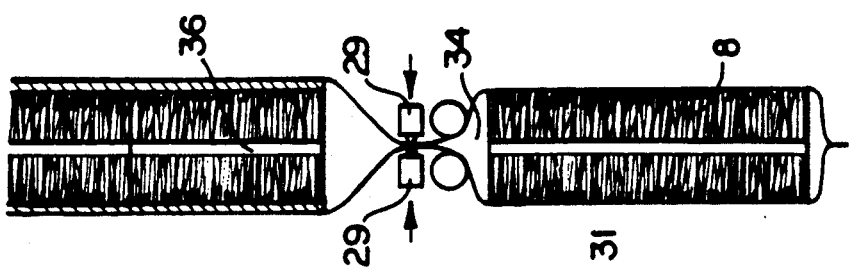
Figure 2C:
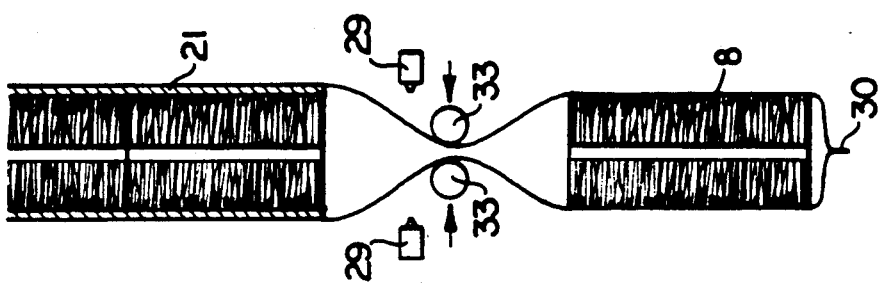

United States Patent [19]

Westaway

[11] Patent Number: 5,088,271
[45] Date of Patent: Feb. 18, 1992

[54] METHOD OF AND APPARATUS FOR PRESERVING FORAGE IN BAGS

[76] Inventor: Mark Westaway, Love Lane Farm, Marldon, Paignton, Devon TQ3 1SP, United Kingdom

[21] Appl. No.: 700,078

[22] Filed: May 3, 1991

Related U.S. Application Data

[63] Continuation of Ser. No. 350,706, filed as PCT/GB87/00758, Oct. 27, 1987, abandoned.

[30] Foreign Application Priority Data

Oct. 27, 1986 [GB] United Kingdom ............ 862562

[51] Int. Cl.⁵ ................ B65B 63/02; B65B 25/02
[52] U.S. Cl. ........................ 53/515; 53/529; 53/551; 53/530
[58] Field of Search .......... 53/435, 438, 439, 451, 53/514, 515, 529, 530, 551; 100/3

[56] References Cited

U.S. PATENT DOCUMENTS

| | | | |
|---|---|---|---|
| 4,040,230 | 8/1977 | Pessel | 53/438 |
| 4,150,613 | 4/1979 | Smee | 100/3 |
| 4,334,466 | 6/1982 | Spiegelberg | 100/3 |
| 4,602,472 | 7/1986 | Ampolini | 53/438 |
| 4,763,574 | 8/1988 | Ast | 100/188 R |
| 4,936,206 | 6/1990 | Miles | 100/3 |

FOREIGN PATENT DOCUMENTS

| | | | |
|---|---|---|---|
| 1954729 | 5/1970 | Fed. Rep. of Germany . | |
| 1960446 | 7/1971 | Fed. Rep. of Germany | 53/529 |
| 2109834 | 9/1972 | Fed. Rep. of Germany | 53/529 |
| 1463900 | 11/1966 | France . | |
| 2305099 | 10/1976 | France . | |
| 452979 | 3/1968 | Switzerland . | |
| 1427998 | 3/1976 | United Kingdom . | |
| 2130547 | 6/1984 | United Kingdom . | |

*Primary Examiner*—John Sipos
*Attorney, Agent, or Firm*—Kilpatrick & Cody

[57] ABSTRACT

A preserved forage crop, such as grass or lucerne, is cut and allowed to wilt to a given dry matter content, it is then conventionally baled and bales (1) are subsequently compacted in one direction only and sealed into airtight bags (31) before the compacted bale can fully re-expand; preferably the bale (1) is cut longitudinally (z) and each part-bale (8) is compacted longitudinally to produce flat-sided, oblong bagged bales of stackable proportions and forage crop sealed under compaction in the bag and layered in planes (y) or (z) transverse to the longitudinal axis of the bag.

4 Claims, 3 Drawing Sheets

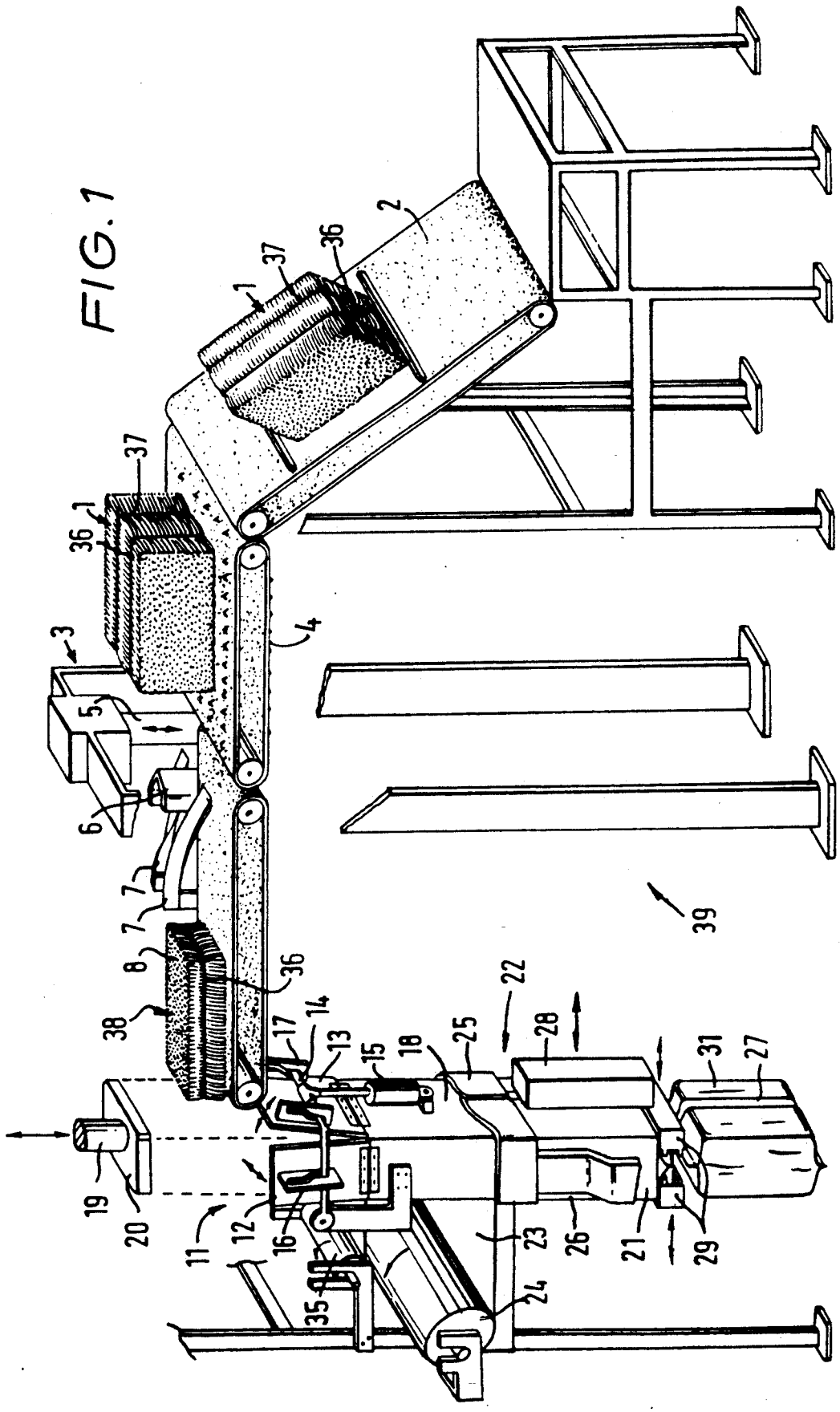

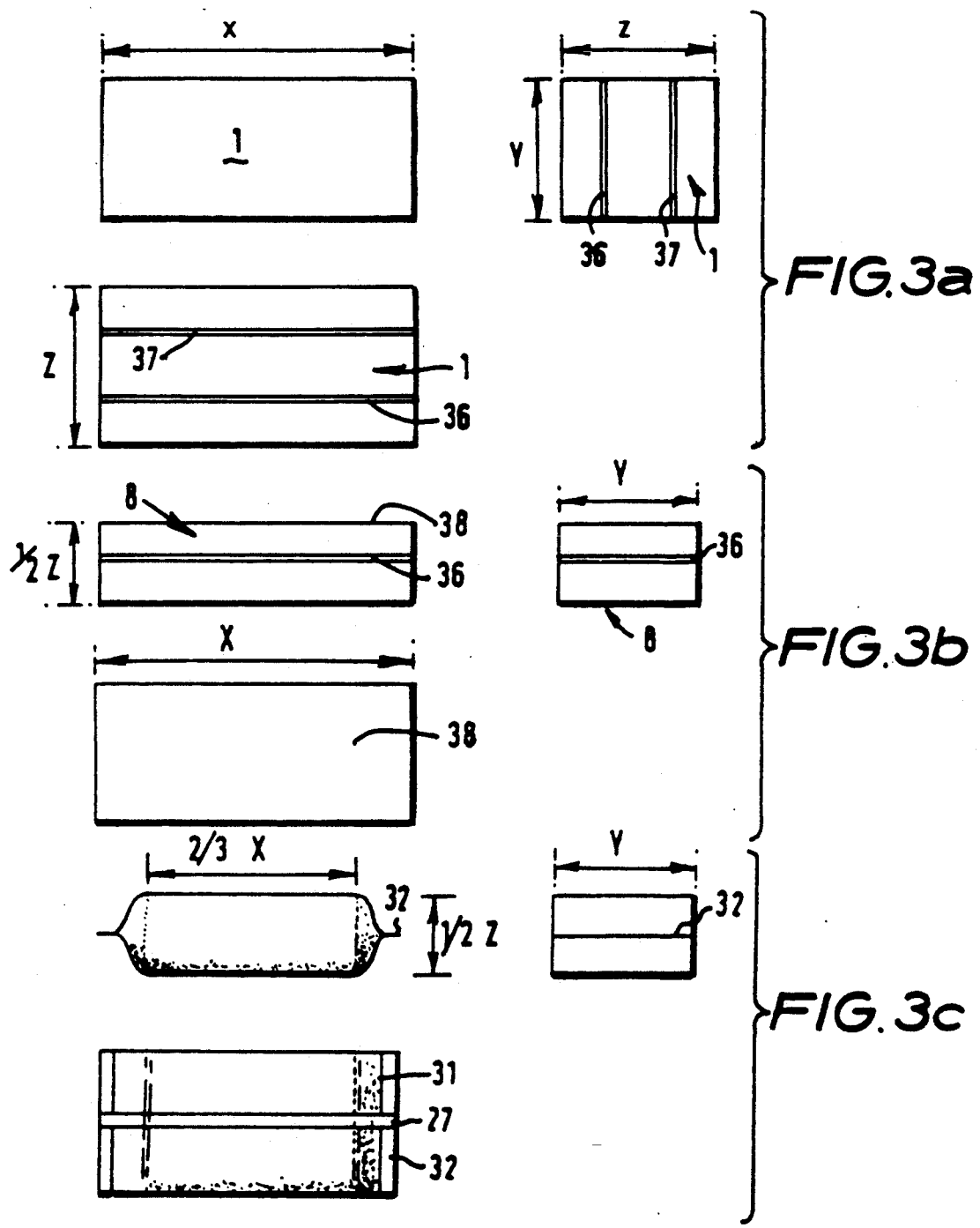

METHOD OF AND APPARATUS FOR PRESERVING FORAGE IN BAGS

This is a continuation of copending application Ser. No. 07/350,706 filed on Apr. 26, 1989, now abandoned, which application was originally filed as PCT application Ser. No. PCT/GB87/00758 on Oct. 27, 1987.

This invention relates to a method of and apparatus for preserving fermented forage in bags and also relates to bags of fermented forage.

In the production of preserved forage material, for example by the method described in Patent Specification No. GB 1512804, it has been the practice to bale the material in the field and subsequently to compress it further in a special machine before sealing it within a bag to prevent a mass flow of air in or out, and permitting the escape through a non-return valve of the gaseous products of initial aerobic fermentation. Following bagging, some re-expansion can take place, with the result that the bagged material would tend to assume a rectangular shape with bulging, part spherical sides and would thus be very awkward to handle and stack.

The aforesaid special machine is a compacting machine where the bales are fed longitudinally from the side into a chamber where they are compressed along the three axes successively, with the major compression taking place along the longitudinal axis of the bale, that is to say at right angles to the general direction of the majority of the stalks in the forage. The bale was then "extruded" sideways i.e. transversely of the longitudinal axis of the bale through a spout over which a bag was placed lengthwise to receive it. Re-expansion of the bale was then resisted by the bag most of the re-expansion being sideways in the bag, resulting in a bagged material with somewhat bulged sides. Aside from any other considerations, material bagged in this way does not stack conveniently, on account of its shape. When, for example, it has been desired to stack the material on pallets for ease of bulk handling, it has been necessary to shrink-wrap each entire pallet load to prevent parts of the load being shed inadvertently.

According to the present invention, a method of preserving a forage crop comprises the steps of:
  i) cutting the crop in the field;
  ii) wilting the cut crop to a given dry matte content;
  iii) picking up, compacting and baling the crop without chopping;
  iv) further compacting the baled crop in one direction only of the bale;
  v) loading a further compacted bale into a bag in the direction of further compaction; and,
  vi) sealing the bag transversely to the direction of further compaction to be airtight before further the compacted bale can fully re-expand from said further compaction.

By this means, the further compacted bale only partially re-expands back along the further direction of compaction, the bag preventing full re-expansion of the compacted bale and leaving the sides of the bale essentially unchanged. Also, sealing the bag before full re-expansion leaves free the sealing zone of the bag, resulting in an airtight seal and retaining the crop compaction that is essential to the fermentation process, as the amount of oxygen remaining in the sealed bag has to be limited if the crop is to ferment and not spoil.

In a preferred embodiment, the baled crop is further compacted only longitudinally of the bale. The longitudinal axis of a bale is hereinafter defined as being that axis along which the bale was originally compressed during formation by a conventional hay baler; resulting in a bale with ties running longitudinally thereof and the majority of the stalks in the forage lying transverse to the longitudinal bale axis. A conventional hay baler is described in "The Universal Encyclopaedia of Machinery", published by George Allen & Unwin Limited in 1967 at pages 436 and 437.

Although it is possible to achieve adequate compression in the field by a suitable design of baler, and even by choosing suitable bale chamber dimensions and proportions, the means required to bag the material while preventing substantial re-expansion is somewhat unwieldy for incorporation into a moving machine. Clearly, a purpose designed or modified baler would be an expensive item. Also, special baling would tend to slow down the overall process which could prevent maximum advantage being taken of the right weather and crop conditions for cutting and wilting the crop. It is therefore preferred to bale the cut crop with a conventional hay baler, wherein some compression longitudinally of the bale occurs, and subject it later to a further compacting stage in association with bagging.

A further advantage of first baling the wilted crop and thereafter further compacting and bagging the baled crop is that bales can be left in a field for up to 24 hours after baling without deterioration to the wilted crop. Thus, wilted crop can be baled at the right time and bagged later; this time interval also enables the overall operation to be smoothed out as crop baled the previous afternoon, say, can be further compacted and bagged in a morning before that day's crop is ready for baling.

In an embodiment of the method of the present invention, conventionally formed and sized bales are cut prior to further compaction of the baled crop. By a selection of size of cut bale, which controls transverse dimension of width and depth and of further compaction of the cut bale, which controls the longitudinal dimension of length, bagged bales can be produced having length to width to depth proportions well suited to stacking and palletisation.

By way of example, an initial 112 lb (nominal 50 Kg) bale of normal proportions such as 36:18:16, when cut in two and further compacted lengthwise can form a pair of bagged 56 lb (nominal 25 Kg) bales each of 24:16:9 proportion. The 3 to 2 ratio of length to width of the bagged bale can be stacked in alternating, bonded layers on a standard 48×48 pallet. By stacking in alternate directions a well bonded pile can be formed which requires the minimum of support for adequate preservation of its integrity during transport. Bales bagged by current methods on the other hand need to be shrink-wrapped after stacking on a pallet in order to keep them from falling off and still need to be handled by slings whereas bagged bales in accordance with the present invention are far more stable and can be stacked on pallets and thereafter handled by fork-lift trucks. Also a reasonably light weight, easily handled bagged bale is produced.

Clearly, bales of other sizes can be cut accordingly to produce bagged bales having easily stackable dimensions.

In a preferred embodiment of the present invention, a conventionally formed bale is cut longitudinally thereof.

By cutting and further compacting the bales longitudinally the original orientation of the cut crop transverse to the longitudinal axis of the bale is maintained and this has the advantage that a bagged bale can be opened at the top in the usual way and the fodder can easily be removed in layers without disturbing remaining fodder; this lessens entry of air and, combined with the ease of rolling a bag top to re-seal it, enables fodder to remain usable in an opened bag for longer periods of time.

By way of example, the aforementioned 36:18:16 bale, parted into a 36:9:16 half-bale would be compacted to approximately half its length, i.e. 18:9:16 and then sealed into a 24:9:16 bag. After sealing, the further compacted part bale partially re-expands longitudinally to 24:9:16 dimension. Note that as no effective further compaction is made width or depthwise of the part bale, there is no re-expansion and the bale sides therefore remain essentially flat; again aiding stacking of bagged bales.

Further compaction is preferably limited to not more than a 50% reduction in bale length to prevent bruising or other damage to the crop.

Also according to the present invention, forage crop bagging apparatus comprises:

i) means to receive a crop in compacted bales of given size and feed the bales longitudinally to a chamber having cross-sectional dimensions substantially the same as the transverse dimensions of the bale;

ii) means operative within the chamber to further compact the bale longitudinally thereof;

iii) bagging apparatus at the longitudinal output from the chamber to receive further compacted bales therefrom; and, iv) means to transversely seal further compacted bales airtight in the bags before full re-expansion of the bales from said further compaction.

In a preferred embodiment of the present invention:

the further compaction chamber is elongate, is arranged with its longitudinal axis vertical and is provided with a discharge spout at its lower end;

the compaction means is a plunger reciprocable within the compaction chamber and operative along the longitudinal axis thereof;

the further compaction chamber is designed to contain at least two bales, with an incoming bale compacted between the plunger and the preceding bale;

the apparatus is arranged to permit the insertion of a separator sheet between adjacent bales fed to the further compaction chamber;

the bagging apparatus is a vertical form and fill bagger, disposed about the further compaction chamber and having vertical seam sealing means to form plastics material sheeting into a tube about the further compaction chamber and horizontal sealing and cutting means below the discharge spout to form sealed bags to receive and contain compacted bales;

the stroke of the plunger is arranged to longitudinally compact a bale in the further compaction chamber to a length less than a given length, and the bagger is arranged to form a bag of given length, whereby a further compacted bale can be discharged into a bag with shorter length than that of the bag;

a cutter is provided to longitudinally cut bales into part bales of given transverse dimensions and means are provided to positively carry bales past the cutter;

the cutter is arranged level with the top of the further compaction chamber, an elevator is provided to lift bales to the cutter and an in-feed hopper is provided at the top of the further compaction chamber to receive part bales from the cutter;

the in-feed hopper is provided with hinged side and front plates controlled to be opened away from one another to receive a part bale, then be closed towards one another to align a part bale with the further compaction chamber.

Again, according to the present invention, preserved and fermented, essentially uni-directionally compacted forage crop is sealed in an airtight bag and is partially re-expanded towards the bag seal.

In a preferred embodiment, the bag is elongate, is sealed transversely to the major axis thereof and the crop is layered in planes transverse to said major axis;

the bagged crop is oblong with essentially flat sides; and, the ratio of the major axis dimension to one transverse dimension is 3:2.

Figure 2B:
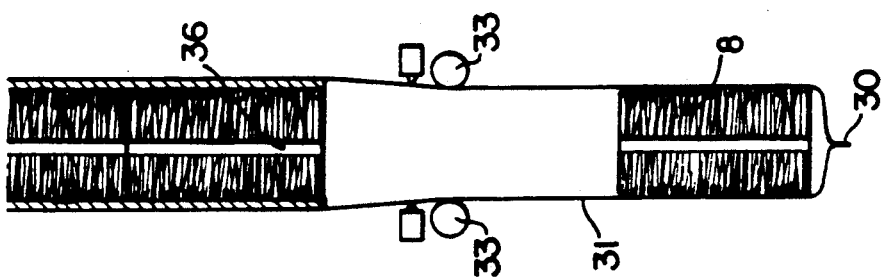
Figure 2A:
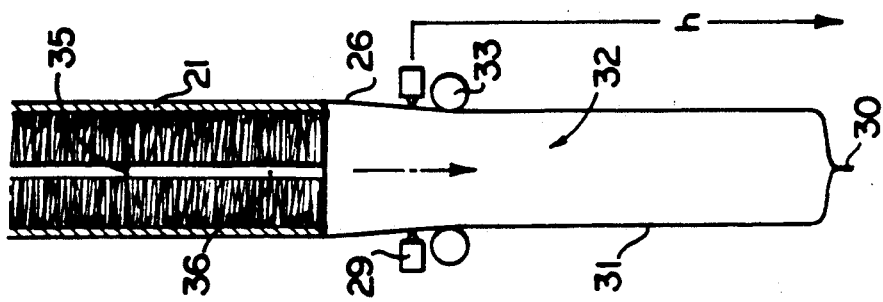

The above and other features of the present invention are illustrated, by way of example, in the Drawings wherein:

FIG. 1 is a schematic, perspective view of bale cutting, compacting and bagging apparatus in accordance with the present invention;

FIGS. 2a, b, c, d and e are illustrative, sectioned views of a bag being formed by the apparatus of FIG. 1 and a compacted bale being loaded therein; and, FIGS. 3a, b, and c are, respectively, side and end elevations and a plan of a bale, a longitudinally cut and quarter rolled part bale and a bagged part bale formed by the apparatus of FIG. 1.

As shown by FIG. 1 a bale 1 of wilted, 50% by weight dry matter, forage (such as grass or lucerne) is transported by an elevator conveyor 2 to a cutting station 3. A further, horizontal conveyor 4, is provided with spikes to positively carry the bale 1 longitudinally past a cutter 5, e.g. a silage knife. A hydraulic ram could be used instead of spiked conveyor 4 to force the bale 1 past the silage knife. Immediately behind the silage knife is a stainless steel divider 6 with a pair of rails 7 to separate and roll a cut bale as illustrated at 8, through a quarter-turn about the longitudinal axis of the bale.

Hereafter only half of the apparatus is illustrated, normally a second vertical bale compactor and bagger is arranged side-by-side with the one illustrated. This being to process both half-bales simultaneously, to speed production and, as is normally required for any agricultural crop storage and preservation process, to provide redundancy of machinery.

The vertical bale compactor 10 has an in-feed hopper 11 to receive cut bales 8 end on, i.e. longitudinally. The in-feed hopper 11 has hinged side and face plates 12, 13 respectively controlled by a pivoted stirrup 14 powered by a hydraulic ram 15, the stirrup operating in cams 16, 17 attached to the plates such that the plates are controlled by stirrup 14, ram 15 and cams 16, 17 to open away from one another to form a tapering chute to receive bales and then close towards one another to align a bale with an open-ended, elongate stainless steel further compaction chamber 18 directly below the in-feed hopper 11. The cross-sectional dimensions of the further chamber 18 are essentially the same as the transverse dimensions of the in-fed part bale. There is sufficient power in the in-feed hopper plates to slightly compress the sides of a part-bale to ensure that they conform to the standardised, cross-sectional size of the further compaction chamber 18.

Located above the further compaction chamber 18 is a long-stroke, hydraulic ram of which the piston 19 terminates in a plunger 20 of complementary shape to the further compaction chamber 18. The piston and plunger operates down through the in-feed hopper and acts to compact the in-fed part-bale 8 against the resistance of a bale or bales already within and further down the chamber. The further compaction chamber 18 is long enough to house 4 to 5 bales of varying degrees of compaction, with the further compacted bales emerging from a discharge spout 21 at the bottom of the chamber for each operational stroke of the piston and plunger 19, 20.

Arranged about chamber 18 is a generally conventional vertical form and fill bagger 22 which draws plastics sheet 23 from a roll 24 through a forming shoulder 25 into a tube 26, the overlapped vertical seam 27 of which is sealed by a vertical sealing bar 28, to a horizontal double sealing bar and cutter 29 beneath the discharge spout 21.

In operation, as shown by FIGS. 2a to e, the tube 26, having already had the bottom 30 sealed by the preceding cycle, is fed downwardly so that the bag bottom 30 is a given distance 'h' below the horizontal sealing bar 29; the bag bottom is sensed by a sensor (not shown) below the spout 21 and thus the bag can be formed to a given length h. Air is then blown into the bag, as shown by the arrows in FIG. 2a, between the tube 26 and the discharge spout 21, to inflate the empty, open mouthed bag 31 and smooth-out any wrinkles, especially around the top 32 of the bag. Compacting plunger 19 is then operated and a fully compacted bale 8 is ejected into the bag 31 (FIG. 2b). As soon as the fully compacted bale is in the bag a pair of pivoted rollers 33 are moved towards one another to squeeze the bag top 32, expressing unwanted air out of the bag (again as indicated by the arrows in FIG. 2c) and to inhibit longitudinal re-expansion of the bale 8. As shown, the fully compacted bale 8 is approximately half the overall bag length h as it emerges from the discharge spout 21 but it will immediately start to re-expand. Once excess air has been expelled from the bag 31, the horizontal sealing bars 29 are closed towards one another, to seal the top 32 of bag 31, cut the sealed bag from the tube 26 and form the bottom seal 30 for the next bag, as indicated by FIG. 3e. Most importantly, a clear head space 34 is left above the bale 8 within the bag top 32 during the sealing operation to prevent any crop protruding across the sealing zone (between the pinch point of rollers 33 and the top seal 32) and thus spoil the seal 32.

As it is the resistance of bales accumulated in the chamber 18 that provides back pressure for compaction, each bale has to be separated from the preceding bale and this is effected by plastics sheeting separators 35 placed between the bales before they are fed into the chamber 18.

In an example and as illustrated by FIGS. 3a, b and c, bales 1 of wilted grass from a John Deer 466A or equivalent hay baler having dimensions of 36" length (x), 18" height (y) and 16" depth (z) (915 mm × 457 mm × 406 mm) are off-loaded from a bale wagon onto the elevator 2 on their sides i.e. orientated with the longitudinal axis of the bale in the direction of travel and the transverse y and z axes respectively upwards and across the conveyor; this leaves the two baling bands 36, 37 longitudinally of the bale and each lying in a generally vertical plane. After cutting and rolling through a quarter-turn about the longitudinal axis a part bale 8 is formed still of the same length x, but now of the y dimension in width and a half z dimension in height; each bale 8 having one of the bands 36 or 37 longitudinal of the bale but now in a generally horizontal plane.

The part bale is then tipped and fed into in-feed hopper 11 and from thence into further compaction chamber 18 that is y dimension wide and half z dimension deep. The bale is compacted to a half x dimension length whilst the bag 31 is formed to a two-thirds x length ($-h$). There is thus an approximately one-quarter x head space 34 when the fully compacted bale 8 is in the bag 31 whilst horizontal sealing bar 29 is operated. Thereafter, the bale can only expand longitudinally to the two-thirds x length of the bag, the transverse dimensions of y and half z remaining essentially unaltered by the whole process. For an original 36"×18"×16" bale a 24"×16"×9" bagged bale is formed and, as previously described, these pack in alternate layers on a standard 48" pallet; three bales one way and two bales the other.

The bagged bales have generally flat sides whilst cut side 38 has a surface that exerts a high frictional grip against the surface of a surrounding bag. This greatly facilitates the operation of sealing the bag after further compaction and bagging. The cut surface is also flat, and remains more or less so, even after subsequent compaction so that the creation of a stable pile of bagged bales is greatly facilitated.

The whole apparatus is supported on a framework indicated at 39. The use of a vertical system has been found to have considerable advantages. For example, it permits the use of very high forming pressures in further compaction chamber 18, which necessarily has to be unsupported over a considerable length. Attempts to use horizontal chambers have resulted in their deforming under the combined effect of friction and gravity. It also facilitates movement of bales through the apparatus.

It will be appreciated that by starting with a bale of about twice the required size a further advantage is obtained in that field production can be that much faster. Also in the further compacting process, the treatment speed is increased due to having two treatment channels from each initial bale feed.

Whilst it is preferable and most economical to use a conventional hay baler that lays the crop generally transversely of the longitudinal axis of the bale, other crop orientations with a bale or bales of different shapes and proportions, requiring different directions and numbers of cuts to produce a bagged bale (preferably of stacking proportions ) can be employed. The proviso is that a bale or part of a bale is compacted in one direction only and that the bag is loaded in the direction of compaction with the fully compacted bale restrained by the bag from fully re-expanding and re-expanding against the bag seal. The sides of the bale are left uncompacted and a rectangular bale would thus remain with substantially flat sides and still have good sealing of the bag by partial re-expansion of the compacted bale within the formed bag.

I claim:
1. An apparatus for bagging forage crop comprising:
   i) a means for conveying a compacted baled crop to a cutting station having:

(a) a knife for cutting the baled crop along the longitudinal axis of the bale;

(b) a divider for separating the thus formed part-bales; and (c) a pair of rails to rotate each part bale through a quarter-turn about the longitudinal axis of the base;

ii) a vertical bale compactor and a bagger apparatus arranged side by side with a second vertical bale compactor and a bagger apparatus to further process each part-bale individually and simultaneous:

(a) each vertical bale compactor having:

(1) an in-feed hopper with hinged side and face plates attached to a pivoted stirrup by cams which are acted upon by a hydraulic ram such that the movement of the in-feed hopper plates is controlled by the hydraulic ram, pivoted stirrups, and cams to open away from one another to form a tapering chute to receive a part-bale and to subsequently close the plates to compress and align a part-bale with the compaction chamber located directly below the in-feed hopper;

(2) each vertical bale compactor further having a long-stroke hydraulic ram which terminates in a plunger of complementary shape to the compaction chamber, wherein the plunger operates down through the in-feed hopper and acts to further compact the uppermost part-bale against part-bales already in the compaction chamber, and a discharge spout to deliver further compacted part-bales into plastic bags;

(3) each vertical bale compactor being arranged to permit the insertion of plastic separator sheets between part bales; and (b) each bagger apparatus having a means for plastic sheeting to be drawn from a roll of plastic sheeting through a forming shoulder to form a plastic tube, the overlapping seam of which is sealed by a vertical sealing bar, further having a horizontal sealing bar for sealing and cutting the sealed plastic tube to form a plastic bag, a sensor to control the downward feed of the plastic bag, and directed pressurized air to inflate the formed plastic bag in order to receive the further compacted part-bale.

2. A forage crop bagging apparatus comprising:

(a) a means for receiving a forage crop in a compacted bale of given size;

(b) a cutter for cutting the bale longitudinally into part-bales arranged substantially level with the top of a compaction chamber having cross-sectional dimensions substantially the same as the transverse dimensions of the part-bales;

c) a means for carrying the bale past the cutter;

d) an in-feed hopper at the top of the compaction chamber to receive the part-bales from the cutter and feed the part-bales into the compaction chamber;

e) a means for carrying the part-bales to the in-feed hopper;

f) a means for further compacting the part-bales in the longitudinal direction within the compaction chamber;

g) a bagging apparatus at a longitudinal output of the compaction chamber to receive the further compacted part-bales therefrom; and h) a means for transversely sealing the further compacted part-bales airtight in a bag before full re-expansion of the further compacted part-bales.

3. The apparatus of claim 2, wherein the in-feed hopper is provided with hinged side and front plates controlled to be opened away from one another to receive a part-bale and be closed towards one another to align a part-bale with the compaction chamber.

4. A forage crop bagging apparatus comprising:

(a) a means for receiving a forage crop in a compacted bale of given size;

(b) a cutter for cutting the bale longitudinally into part-bales;

c) a means for carrying the bale past the cutter;

d) a compaction chamber of cross-sectional dimensions substantially the same as the transverse dimensions of the part-bales and having an in-feed hopper at an input to the compaction chamber to receive the part-bales from the cutter and feed the part-bales into the compaction chamber;

e) a means for carrying the part-bales from the cutter to the in-feed hopper;

f) a means for further compacting the part-bales in the longitudinal direction within the compaction chamber;

g) a bagging apparatus at a longitudinal output of the compaction chamber to receive the further compacted part-bales therefrom; and h) a means for transversely sealing the further compacted part-bales airtight in a bag before full re-expansion of the further compacted part-bales.

* * * * *